(12) United States Patent
Neto et al.

(10) Patent No.: US 10,746,221 B2
(45) Date of Patent: Aug. 18, 2020

(54) METHOD FOR THE PRODUCTION OF A CONNECTING ROD

(71) Applicant: Miba Sinter Austria GmbH, Laakirchen (AT)

(72) Inventors: Jose Correa Neto, Campinas (BR); Daniel Augusto Perugini, Salto (BR)

(73) Assignee: Miba Sinter Austria GmbH, Laakirchen (AT)

( * ) Notice: Subject to any disclaimer, the term of this patent is extended or adjusted under 35 U.S.C. 154(b) by 6 days.

(21) Appl. No.: 16/256,045

(22) Filed: Jan. 24, 2019

(65) Prior Publication Data

US 2019/0249710 A1   Aug. 15, 2019

(30) Foreign Application Priority Data

Feb. 14, 2018   (AT) .................................. 50134/2018

(51) Int. Cl.
| | |
|---|---|
| *F16C 7/02* | (2006.01) |
| *B22F 5/10* | (2006.01) |
| *F16C 33/14* | (2006.01) |
| *F01M 1/06* | (2006.01) |

(52) U.S. Cl.
CPC ................ *F16C 7/023* (2013.01); *B22F 5/10* (2013.01); *F01M 1/06* (2013.01); *F16C 33/145* (2013.01); *B22F 2998/10* (2013.01); *B23P 2700/04* (2013.01); *F16C 2204/00* (2013.01); *F16C 2220/20* (2013.01); *F16C 2360/42* (2013.01)

(58) Field of Classification Search
CPC .... F16C 7/00; F16C 7/02; F16C 7/023; F16C 2220/20; B22F 5/10; B23P 2700/04; F01M 1/06
See application file for complete search history.

(56) References Cited

U.S. PATENT DOCUMENTS

| | | | | |
|---|---|---|---|---|
| 3,842,938 A | * | 10/1974 | Barnes-Moss | ............ F16C 3/14 |
| | | | | 184/6.5 |
| 5,997,605 A | * | 12/1999 | Carlbaum | ............... B22F 5/003 |
| | | | | 419/28 |

(Continued)

FOREIGN PATENT DOCUMENTS

| | | |
|---|---|---|
| DE | 1 266 062 B | 4/1968 |
| DE | 10 2010 008 654 A1 | 8/2011 |

(Continued)

*Primary Examiner* — Prasad V Gokhale
(74) *Attorney, Agent, or Firm* — Collard & Roe, P.C.

(57) ABSTRACT

A method produces a connecting rod from a sintered material, which rod has at least one bore having a center axis, and has a first connecting rod eye in a connecting rod head, and a second connecting rod eye in a connecting rod foot, wherein the connecting rod head is connected with the connecting rod foot with a connecting rod shaft, wherein the bore is configured in the connecting rod shaft, wherein furthermore, the connecting rod is produced from a metallic powder, in accordance with a sintering process, for which purpose the powder is pressed into the corresponding mold to form a green compact, the bore is introduced into the green compact, and the green compact is afterward sintered. The bore is introduced into the green compact as a first and second partial bore, proceeding from the connecting rod foot and from the connecting rod head.

10 Claims, 1 Drawing Sheet

(56) References Cited

U.S. PATENT DOCUMENTS

| | | | |
|---|---|---|---|
| 6,350,407 B1* | 2/2002 | Sakata | B22F 3/16 |
| | | | 419/38 |
| 2016/0265580 A1* | 9/2016 | Elie | B22D 19/02 |
| 2017/0320136 A1* | 11/2017 | Sonoda | B22F 5/10 |
| 2019/0217388 A1* | 7/2019 | Take | B22F 3/003 |

FOREIGN PATENT DOCUMENTS

| | | |
|---|---|---|
| WO | 02/070174 A1 | 9/2002 |
| WO | 2011/101074 A1 | 8/2011 |

* cited by examiner

METHOD FOR THE PRODUCTION OF A CONNECTING ROD

CROSS REFERENCE TO RELATED APPLICATIONS

Applicant claims priority under 35 U.S.C. § 119 of Austrian Application No. A 50134/2018 filed Feb. 14, 2018, the disclosure of which is incorporated by reference.

BACKGROUND OF THE INVENTION

1. Field of the Invention

The invention relates to a method for the production of a connecting rod from a sintered material, which rod has at least one bore having a center axis, a first connecting rod eye in a connecting rod head, and a second connecting rod eye in a connecting rod foot, wherein the connecting rod head is connected with the connecting rod foot with a connecting rod shaft, wherein the bore is configured in the connecting rod shaft, wherein furthermore, the connecting rod is produced from a metallic powder, in accordance with a sintering process, for which purpose the powder is pressed into the corresponding mold to form a green compact, the bore is introduced into the green compact, and the green compact is afterward sintered.

Furthermore, the invention relates to a connecting rod composed of a metallic sintered material, which rod has at least one bore having a center axis, a first connecting rod eye in a connecting rod head, and a second connecting rod eye in a connecting rod foot, wherein the connecting rod head is connected with the connecting rod foot with a connecting rod shaft, wherein the bore is configured in the connecting rod shaft, wherein furthermore, the bore is introduced into a green compact for the connecting rod.

2. Description of the Related Art

Green compact processing, as such, for the production of a bore is already known in sintering technology. Thus, for example, WO 02/070174 A1 describes a method for the production of a sintered metallic component having at least one bore, wherein a powder mixture is hot-pressed to produce a green compact; subsequently, at least one bore is introduced into the green compact by means of chip-cutting processing methods, and subsequently, the green compact is sintered.

WO 2011/101074 A1 describes a method for the production of a component, in particular of a connecting rod, having a bore and an at least partially annealed bore surface, wherein the method comprises the following steps: making a sintered green compact available; providing a bore in the green compact; sintering the green compact; and annealing at least a part of the bore surface, without previous processing of the bore surface to be annealed.

The production of connecting rods having small connecting rod eyes is problematical, since these can no longer be efficiently heat-treated using conventional methods, for example annealed and/or vapor-treated or plasma-nitrided using known methods. For this reason, the industry has made a transition to providing a bore in the connecting rod shaft, by way of which a lubricant can be passed to the small connecting rod eye from the large connecting rod eye. Such connecting rods are used in compressors, for example. In these applications, the bore can have a diameter of less than 2 mm.

SUMMARY OF THE INVENTION

It was the task of the invention to be able to produce such a bore in a connecting rod shaft efficiently, with great precision.

The task of the invention is accomplished, in the case of the method stated initially, in that the bore is introduced into the green compact as a first and second partial bore, proceeding from the connecting rod foot and from the connecting rod head.

Furthermore, the task of the invention is accomplished, with the connecting rod stated initially, in which the bore is introduced into the green compact as a first and second partial bore, proceeding from the connecting rod foot and from the connecting rod head.

It is advantageous, in this regard, that shorter drills can be used due to production of the bore from two sides, and therefore the precision of the bore can be improved, since shorter drills have less of a tendency to bend during drilling. Furthermore, in this way the thermal stress on the drill and, above all, on the green compact during drilling can be reduced, since the processing time for production of a partial bore is shorter than the processing time for production of the entire bore. The resulting heat can therefore be better conducted away from the connecting rod shaft.

Preferably, the bore is produced from the two partial bores, each representing half, since in this way, the effects mentioned above can be further improved.

It is furthermore advantageous if, according to one embodiment variant of the method, the first and the second partial bore are produced at the same time, and thereby the total drilling time and thus also the total time of thermal stress of the green compact due to drilling can be reduced.

Preferably, the method is used for production of a bore that has a diameter x and a length in the direction of the center axis of at least 2x, wherein this diameter x is less than or equal to 2 mm, according to a further embodiment variant. For such bores, in particular, the method has proven to be advantageous, since bores having these dimensions are more difficult to produce with very great precision in mass production.

According to another embodiment variant of the method, it can be provided that a ring groove is formed in a starting region of the first and/or the second partial bore(s). Thereby the region of entry of the drill into the connecting rod shaft can be brought out of the region of the bearing surface of the connecting rod. The ring groove can contribute to further distribution of the lubricant over the circumference of the connecting rod eye or the connecting rod eyes.

Although the bore can fundamentally be freely introduced into the green compact, it is advantageous for reduction of the tolerances if the green compact is held using a clamping apparatus during production of the bore.

Preferably, a clamping apparatus on which the green compact can support itself with its full area is used for this purpose, since in this way, better support of the green compact, which as such is at risk of breakage, can be achieved.

According to another embodiment variant of the method, it can be provided that the clamping apparatus has at least one guide element for at least one drill, with which the at least one bore in the green compact is produced. In this way, a reduction in scrap can be achieved, in that material break-outs due to drilling in the region of the bore can be better prevented.

According to another embodiment variant in this regard, it can be provided that the green compact is laid against or can be laid against the guide element. In this way, a further improvement of the ability to process the green compact can be achieved, in that the latter can be supported in the clamping apparatus with a greater proportion of its surface.

For a further reduction of material break-outs, it can be provided that the green compact has pressure applied to it during the production of the at least one bore.

In order to protect the green compact during drilling, as much as possible, and to avoid premature sintering of the powder in the region of the drill, it can be provided that a drill is used that has at least one channel in its interior, wherein this channel has an exit opening that is configured in the front end region of the drill.

BRIEF DESCRIPTION OF THE DRAWINGS

Other objects and features of the invention will become apparent from the following detailed description considered in connection with the accompanying drawings. It is to be understood, however, that the drawings are designed as an illustration only and not as a definition of the limits of the invention.

In the drawings.

DETAILED DESCRIPTION OF PREFERRED EMBODIMENTS

As an introduction, it should be stated that in the different embodiments described, the same parts are provided with the same reference symbols or the same component designations, wherein the disclosures contained in the description as a whole can be applied analogously to the same parts having the same reference symbol or the same component designations. Also, the position information chosen in the description, such as at the top, at the bottom, on the side, etc., for example, refers to the figure being directly described and shown, and this position information should be transferred analogously to a new position in the case of a change in position.

Figure 1:
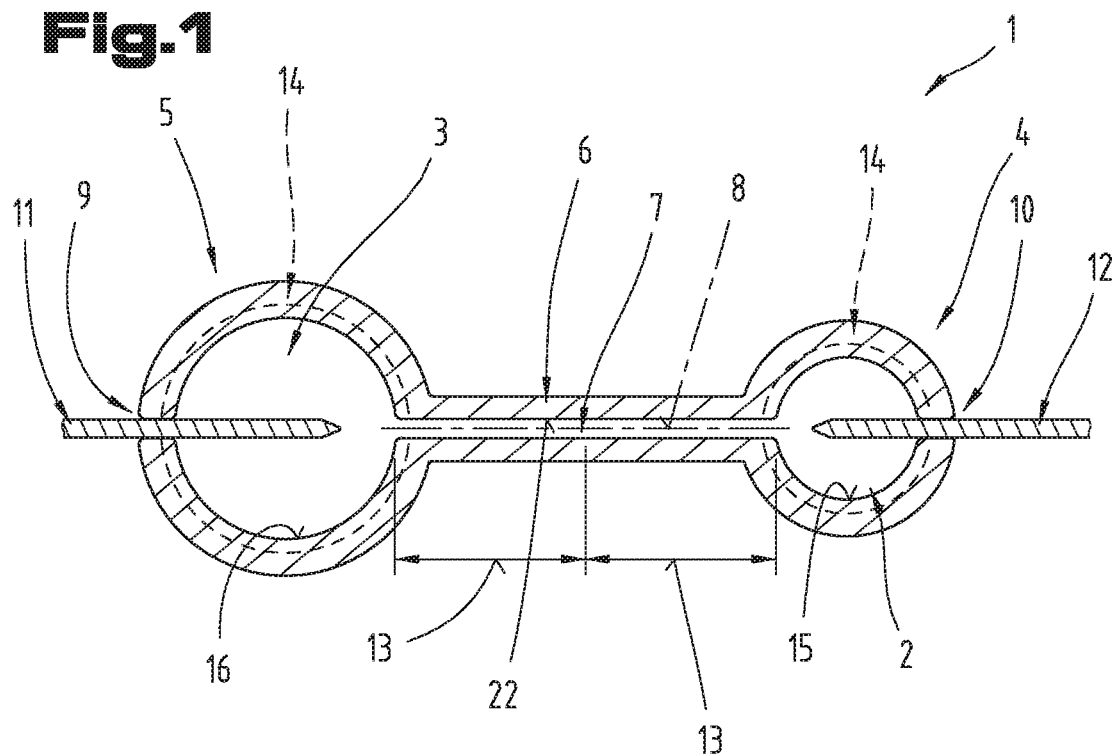
FIG. 1 shows a simplified, schematic representation of a connecting rod in cross-section.

As was already discussed in the introduction, the invention relates to a method for powder-metallurgical production of a connecting rod 1, as can be seen in FIG. 1. The connecting rod 1 is preferably used in a compressor, which is used, for example, in cooling units, such as refrigerators, for example, or in car air-conditioning systems.

Powder-metallurgical methods (sintering methods) as such are known from the state of the art, so that further explanations regarding the fundamental method of procedure are not necessary. For the sake of completeness of the present description, it will only be mentioned that these methods at least comprise the steps of pressing of a metallic powder to form a green compact, and sintering of the green compact at an elevated temperature (for example between 900° C. and 1300° C.). If necessary, the sintered component can subsequently also be calibrated in a calibration die. It is furthermore possible that the connecting rod 1 is hardened during sintering and/or after sintering. For hardening during sintering, a metallic powder that can be sinter-hardened can be used, as known from the state of the art. Hardening after sintering can take place, for example, by quenching the connecting rod 1 from the sintering heat.

The connecting rod 1 comprises a small or first connecting rod eye 2 and a large or second connecting rod eye 3. The small connecting rod eye 2 is configured in a connecting rod head 4, and the large connecting rod eye is configured in a connecting rod foot 5. The connecting rod head 4 is connected with the connecting rod foot 5 by way of a connecting rod shaft 6. Furthermore, a bore 7 is configured in the connecting rod shaft 6, which bore serves as a lubricant channel, as mentioned above. The bore 7 extends continuously from the small connecting rod eye 2 to the large connecting rod eye 3.

The bore 7 of the connecting rod 1 has a center axis 8. Furthermore, the connecting rod 1 has a second bore 9 along the center axis 8, separated from the bore 7 by the large connecting rod eye 3 and the small connecting rod eye 2, as well as a third bore 10.

For the sake of completeness, it should be mentioned that the connecting rod 1 is preferably configured in one piece, in other words, in particular, does not have a bearing cover that is separated by a break or has been produced to be separated in some other way.

Production of the bore 7 takes place after pressing of the metallic powder to form a green compact and before sintering of the green compact. For this purpose, first the second and the third bore 9, 10 are produced, in order to thereby have access to the connecting rod shaft 6. The bore 7 itself is produced from two partial bores. The first partial bore is introduced into the green compact from the second bore 9, and a second partial bore is introduced into the green compact from the third bore 10. This is indicated in FIG. 1 with the drill 11 inserted through the second bore 9, and with the drill 12 inserted through the third bore 10.

In the event, which is not preferred, that the connecting rod 1 has a removable bearing cover, it is possible to do without the second bore, if applicable.

The second bore 9 can also be produced using the drill 11, and the third bore 10 can be produced using the drill 12. However, the second bore 9 and the third bore 10 can also be produced independent of the bore 7 in the connecting rod shaft 6. The second and the third bore 9, 10 can have the same diameter as the bore 7 in the connecting rod shaft 6. However, they can also have a greater diameter.

Furthermore, it is preferred if the two drills 11, 12 have the same diameter.

In FIG. 1, the preferred embodiment variant of the method is shown. In this variant, the two partial bores are made simultaneously, using the drills 11, 12. However, of course, the possibility also exists that the two partial bores are made one after the other, in other words that the first partial bore is introduced into the green compact the side of the second bore 9, and after its completion, the second partial bore is introduced into the green compact from the side of the third bore 10. If applicable, this method variant can also be carried out using only one drill 11, which, in this case, must of course be unpositioned. Use of two drills 11, 12 has the advantage that no complicated adjustment work is required for repositioning.

Drills without a tip can be used as drills 11, 12, so that the two drills 11, 12 do not interfere with one another while drilling. However, drills 11, 12 with a tip can also be used. In this case, one of the two drills 11, 12 must be retracted before the bore 7 is produced in its entirety. The rest of the remaining center part in the connecting rod shaft 6 is then drilled to finish it using only one of the two drills 11, 12, so that therefore in this case, too, the bore 7 is continuous.

Merely for the sake of completeness, it should be mentioned that the second partial bore is structured to run coaxially to the first partial bore. Therefore the center axes of the drills 11, 12 run coaxially to the center axis 8 of the bore 7 during drilling.

Fundamentally, it is possible to produce a drilled length 12 of the bore 2 that is 0% to 100% of the drilled length 13, using a drill 11, 12. Preferably, however, the bore 7 is produced from the two partial bores, each representing half. In other words, each of the two partial bores comprises 50% of the bore 7.

Fundamentally, the method can be used for bores 7 having any diameter. Preferably, however, the method is used for bores 7 that have a relatively small diameter and, in comparison, a greater drilled length 12. In particular, bores 2 that have a diameter x and a drilled length 13 in the direction of the center axis 8 of at least 2x, in particular at least 3x or at least 4x, preferably between 2x and 30x, particularly preferably between 2x and 20x, are produced using the method. In particular, the diameter can be ≤2 mm, preferably ≤1.5 mm.

As indicated in FIG. 1 with a broken line, a ring groove 14 can be introduced, for example milled into a side wall 15 that delimits the small connecting rod eye 2 and/or into a side wall 16 that delimits the large connecting rod eye 3, in the region of at least one of the two starting regions of the two partial bores, after completion of drilling of the bore 7. The ring groove(s) 13 is/are configured in the connecting rod 1 as an extension of the bore 7, so that lubricant can enter out of the bore 7 also into the ring groove(s) 13. Alternatively to this, lubricant can also be supplied to the bore 7 by way of such a ring groove 13.

Figure 2:
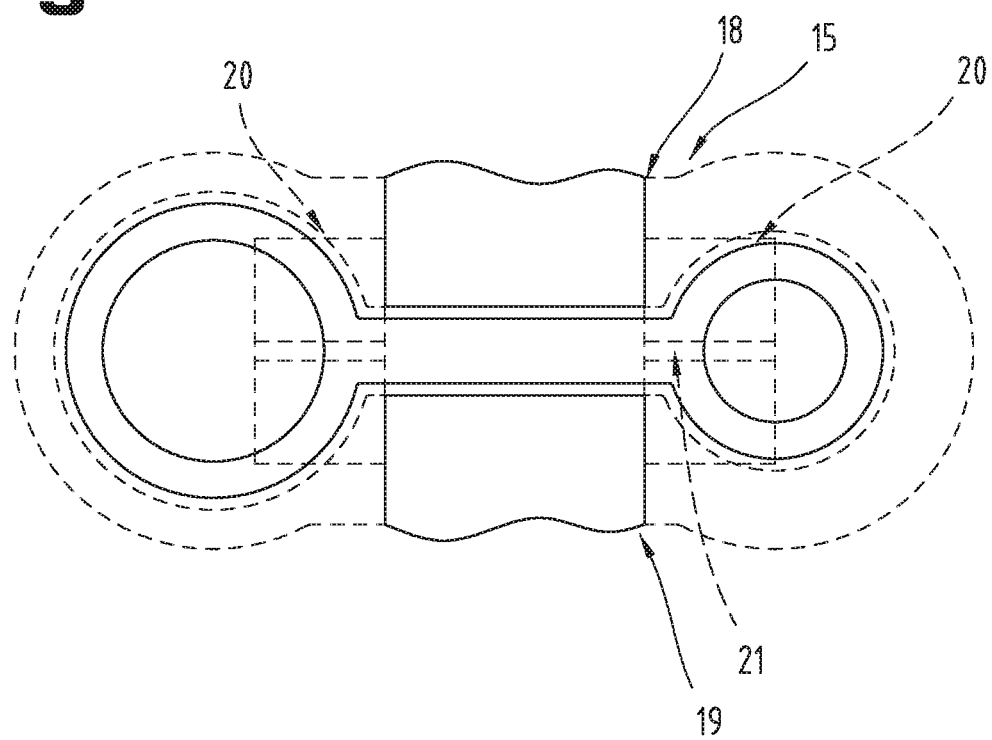
FIG. 2 shows a simplified, schematic representation of a connecting rod in a clamping apparatus.

Preferably, the green compact is clamped for drilling in a clamping apparatus 17, parts of which can be seen in FIG. 2.

The clamping apparatus 17 for production of the bore 7 in the green compact produced using powder metallurgy is preferably configured in such a manner that planar contact with the green compact is possible. For this purpose, the clamping apparatus 17 can have multiple clamping jaws 18, 19. In particular, at least two clamping jaws 18, 19 are used. The clamping jaws 18, 19 replicate the outer contour of the sintered component 1 in the region of the bore 7, and thereby planar contact of the connecting rod 1 in this region is achieved. The connecting rod 1 can only be clamped in the region of the bore 7 to be introduced. However, it is also possible that a comparatively greater region of the connecting rod 1 or the entire connecting rod 1 is clamped in place, in other words, for example, also in the region of the two connecting rod eyes 2, 3, as indicated with a broken line in FIG. 2.

Furthermore, the clamping jaws 18, 19 can be configured to be adjustable in the clamping direction. However, it is also possible that the clamping apparatus 17 is adapted to the size of an embodiment variant of the connecting rod 1, so that the clamping apparatus 17 can only be used for production of this one embodiment of the connecting rod 1, but on the positive side does not have any moving parts.

The inner surfaces of the clamping jaws 18, 19, which surfaces are brought into contact with the outer surface of the green compact, are preferably structured to be smooth.

Furthermore, according to a different embodiment variant, the clamping apparatus 17 can have at least one guide element 20 for the drill(s) 11, 12, as can be seen from the broken line in FIG. 2. The guide element 20 can be structured as a lamella-shaped projection of the clamping apparatus 17, which projection extends beyond the beginning of the bore 7 and has a corresponding recess, through which the drill 11, 12 extends and by which it is guided. The guide element 20 can be disposed in the large or small connecting rod eye 3, 2, in this regard. In addition or alternatively to this, the guide element 20 or a further guide element can be disposed outside of the small or large connecting rod eye 2, 3, at the beginning of the second or third bore 9, 10.

To pass the drill through, the guide element 20 has a continuous bore or recess 21.

According to a further embodiment variant of the clamping apparatus 17, the at least one guide element 20 (multiple guide elements 20 can also be present, for example a guide element 20 per partial bore) can be laid against the green compact in the region of the bore 7.

Together with the clamping apparatus 17, the green compact can be laid into a green compact drilling apparatus. In this green compact drilling apparatus, the at least one bore 7 is produced. This green compact drilling apparatus can have the two drills 11, 12, so that the bore 7 can be produced in one work step. For this purpose, the green compact drilling apparatus can have two drilling machines.

To hold the clamping apparatus 17, the green compact drilling apparatus can have a holding apparatus. This holding apparatus can be configured in block shape. Furthermore, the mass of the holding apparatus can be used to cool the green compact during drilling.

In addition or alternatively to this, cooling using a cooling fluid can also take place. For this purpose, according to one embodiment variant, a drill 11, 12 can be used, which has at least one channel that extends in its interior. In particular, the channel extends over the entire shaft length of the drill 11, 12 and ends in the front end region of the drill 11, 12, in other words, for example, at the drill tip, in an exit opening. A fluid, for example a cooling oil or compressed air, can be supplied by way of the channel.

The at least one channel (preferably, multiple channels are configured) can run in a straight line. Likewise, an at least approximately spiral-shaped or a spiral-shaped progression is possible, in order to thereby be better able to cool the shaft of the drill 11, 12.

Furthermore, according to one embodiment variant of the method, it can be provided that the green compact has pressure applied to it during production of the bore 7. This pressure can be applied to the green compact by way of the clamping jaws 18, 19 of the clamping apparatus 17, for example. Alternatively or in addition to this radial pressure application, the green compact can also have pressure applied to it in the direction of the center axis 8, using corresponding clamping elements and/or the guide elements 20, during drilling.

According to the invention, a connecting rod 1 can therefore be produced, which has at least one bore 7 having a center axis 8, a first or small connecting rod eye 2 in a connecting rod head 4, and a second or large connecting rod eye 3 in a connecting rod foot 5, wherein the connecting rod head 4 is connected with the connecting rod foot 5 with a connecting rod shaft 6, wherein the bore 7 is configured in the connecting rod shaft 4, wherein furthermore, the bore 7 is introduced into a green compact for the connecting rod 1. The bore 7 is introduced into the green compact as a first and second partial bore, proceeding from the connecting rod foot 4 and from the connecting rod head 5.

Since the bore 7 has been introduced before sintering of the green compact, its side wall 22 can have a rough surface caused by sintering.

The term "rough surface caused by sintering" refers to the surface composition of the sintered component 1, which is present after sintering and is not or has not been subjected to any further material-removing or compacting processing.

The exemplary embodiments show or describe possible embodiment variants, wherein combinations of the individual embodiment variants with one another are also possible.

For the sake of good order, it should be pointed out, in conclusion, that for a better understanding of the structure of the sintered component 1, this structure is not necessarily shown to scale.

Although only a few embodiments of the present invention have been shown and described, it is to be understood that many changes and modifications may be made thereunto without departing from the spirit and scope of the invention.

| Reference Symbol List |
| --- |
| 1 connecting rod |
| 2 connecting rod eye |
| 3 connecting rod eye |
| 4 connecting rod head |
| 5 connecting rod foot |
| 6 connecting rod shaft |
| 7 bore |
| 8 center axis |
| 9 bore |
| 10 bore |
| 11 drill |
| 12 drill |
| 13 drilling length |
| 14 ring groove |
| 15 side wall |
| 16 side wall |
| 17 clamping apparatus |
| 18 clamping jaw |
| 19 clamping jaw |
| 20 guide element |
| 21 recess |
| 22 side wall |

What is claimed is:

1. A method for the production of a connecting rod from a sintered material, which rod has at least one bore having a center axis, and has a first connecting rod eye in a connecting rod head, and a second connecting rod eye in a connecting rod foot,
    wherein the connecting rod head is connected with the connecting rod foot with a connecting rod shaft,
    wherein the bore is bored in the connecting rod shaft,
    wherein furthermore, the connecting rod is produced from a metallic powder, in accordance with a sintering process, for which purpose the powder is pressed into the corresponding shape to form a green compact, the bore is introduced into the green compact, and the green compact is afterward sintered, and
    wherein the bore is introduced into the green compact as a first and second partial bore, proceeding from the connecting rod foot and from the connecting rod head.

2. The method according to claim 1, wherein the bore is produced from the two partial bores, each of the partial bores representing the half of the bore.

3. The method according to claim 1, wherein the first and the second partial bore are produced simultaneously.

4. The method according to claim 1, wherein a bore is produced, which has a diameter x and a drilled length in the direction of the center axis of at least 2x.

5. The method according to claim 4, wherein the bore is produced with a diameter of x≤2 mm.

6. The method according to claim 1, wherein a ring groove is formed in at least one of a starting region of the first partial bore and the starting region of the second partial bore.

7. The method according to claim 1, wherein the green compact is held using a clamping apparatus during production of the bore.

8. The method according to claim 7, wherein a clamping apparatus is used on which the green compact can support itself two-dimensional.

9. The method according to claim 1, wherein the green compact has pressure applied to it during production of the at least one bore.

10. A connecting rod made from a metallic sintered material, which connecting rod has at least one bore having a center axis, a first connecting rod eye in a connecting rod head, and a second connecting rod eye in a connecting rod foot,
    wherein the connecting rod head is connected with the connecting rod foot with a connecting rod shaft,
    wherein the bore is arranged in the connecting rod shaft,
    wherein the bore is introduced into a green compact for the connecting rod, and
    wherein the bore is introduced into the green compact as a first and second partial bore, proceeding from the connecting rod foot and from the connecting rod head.

* * * * *